United States Patent
Parris

(10) Patent No.: US 10,140,654 B2
(45) Date of Patent: Nov. 27, 2018

(54) CONCEPTS FOR REPAIR AND SERVICE OF A CONSUMER DEVICE USING A NETWORK CONNECTION AND DIAGNOSTIC TEST

(71) Applicant: United Parcel Service of America, Inc., Atlanta, GA (US)

(72) Inventor: Carrie Parris, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 99 days.

(21) Appl. No.: 14/220,454

(22) Filed: Mar. 20, 2014

(65) Prior Publication Data

US 2015/0269535 A1  Sep. 24, 2015

(51) Int. Cl.
G06Q 30/00 (2012.01)
G06Q 30/08 (2012.01)
G06Q 10/00 (2012.01)

(52) U.S. Cl.
CPC ............ *G06Q 30/08* (2013.01); *G06Q 10/20* (2013.01); *G06Q 10/30* (2013.01); *Y02W 90/20* (2015.05)

(58) Field of Classification Search
CPC .............. G06Q 10/20; G06Q 10/30; G06Q 30/06–30/0645; G06Q 30/08; G06Q 50/01
USPC ......................................................... 709/224
See application file for complete search history.

(56) References Cited

U.S. PATENT DOCUMENTS

| | | | |
|---|---|---|---|
| 8,073,740 B1 | 12/2011 | Siegel et al. | |
| 8,423,012 B1* | 4/2013 | Abou-El-Ella | H04W 8/24 455/419 |
| 8,516,308 B1* | 8/2013 | Gill | H04L 67/34 714/38.1 |
| 8,788,944 B1* | 7/2014 | Gill | G06F 8/61 715/744 |
| 2002/0131404 A1* | 9/2002 | Mehta | G06F 8/61 370/352 |
| 2004/0123281 A1* | 6/2004 | Olrik | H04M 1/72525 717/168 |
| 2004/0243478 A1* | 12/2004 | Walker | G06Q 10/087 705/26.1 |
| 2005/0022182 A1* | 1/2005 | Mittal | G06F 9/445 717/178 |
| 2008/0301231 A1* | 12/2008 | Mehta | G06F 8/61 709/204 |

(Continued)

OTHER PUBLICATIONS

Classified ad 1—no title. (Sep. 24, 1851). New York Daily Times (1851-1857) Retrieved from http://search.proquest.com/docview/95800388?accountid=14753 Retrieved on Jun. 28, 2015.*

*Primary Examiner* — Adam L Levine
(74) *Attorney, Agent, or Firm* — Shook, Hardy & Bacon L.L.P.

(57) ABSTRACT

Embodiments of the present invention provide a repair or purchase program that may be associated with a common carrier. In various embodiments, one or more bids for a target item are received prior to receiving a listing for an item. After receiving the listing for the item, one or more relevant bids may be identified. Information associated with at least one of the identified bids may be provided. A user selection of one of the identified bids may be received. Completion of the transaction indicated by the user's selection may be facilitated. Associated methods, systems, and computer program products are provided.

23 Claims, 11 Drawing Sheets

(56) References Cited

U.S. PATENT DOCUMENTS

| | | | |
|---|---|---|---|
| 2009/0276115 A1* | 11/2009 | Chen | G07C 5/008 |
| | | | 701/29.6 |
| 2010/0088192 A1* | 4/2010 | Bowles et al. | 705/26 |
| 2010/0262481 A1 | 10/2010 | Baker et al. | |
| 2012/0079100 A1* | 3/2012 | McIntyre et al. | 709/224 |
| 2012/0136802 A1* | 5/2012 | McQuade | G06Q 30/0282 |
| | | | 705/347 |
| 2013/0024851 A1* | 1/2013 | Firman | G06F 8/60 |
| | | | 717/170 |
| 2014/0278568 A1 | 9/2014 | Ekman | |

* cited by examiner

FIG. 5

Bid Generator — 500

- item — 512
- Condition — 514
  - ☐ New
  - ☒ Like New
  - ☒ Good
  - ☐ Fair
  - ☐ Poor — 516
- Location
  - ☐ Anywhere
  - ☐ Country ˅
  - ☐ Zip Code
  - ☒ City — Atlanta, GA
  - ☐ From Map — 518

- ☐ Repair
- ☒ Purchase

- make — 520
- model — 522
- year — 524
- Purchase Price $ — 526
- ☐ Beat any other offer by $ — 528
- Ship to: — 530
- Submit — 532

FIG. 6

Transaction Manager — 550

Your Transactions

Click on a transaction for more information

| Trans. ID | Bid ID | Date | Type | Item | Status |
|---|---|---|---|---|---|
| R654834 | RSPA123 | 7/20/2013 | repair | MP3 Player | Repair Complete; shipped to user (Tracking No. 1Z987456321) |
| P8473 | PSPA5 | 7/24/2013 | purchase | Laptop | Complete |
| P365 | PSPA32 | 7/25/2013 | purchase | Bike Lock | user shipped item (Tacking No. 132654798) |
| R2346 | RSPA4 | 7/30/2013 | repair | Smartphone | item received; repair in progress |

552 ⎯ 554 ⎯ 556 ⎯ 558 ⎯ 560 ⎯ 562

Showing Transactions 20-24 of 57

[Previous Page]  [Next Page]

[Return to Dashboard Home]

FIG. 7

Item Listing Generator — 700

— 712 item

Condition
☐ New
☐ Like New
☐ Good
☐ Fair
☐ Poor
— 716

Location
☐ Find Me
☐ Zip Code
☒ City
☐ From Map
— 718

[Atlanta, GA]

— 714
☐ Repair
☒ Purchase

[make] — 720
[model] — 722
[year] — 724

Issue to be repaired: — 715
[                    ]

[Submit] — 732

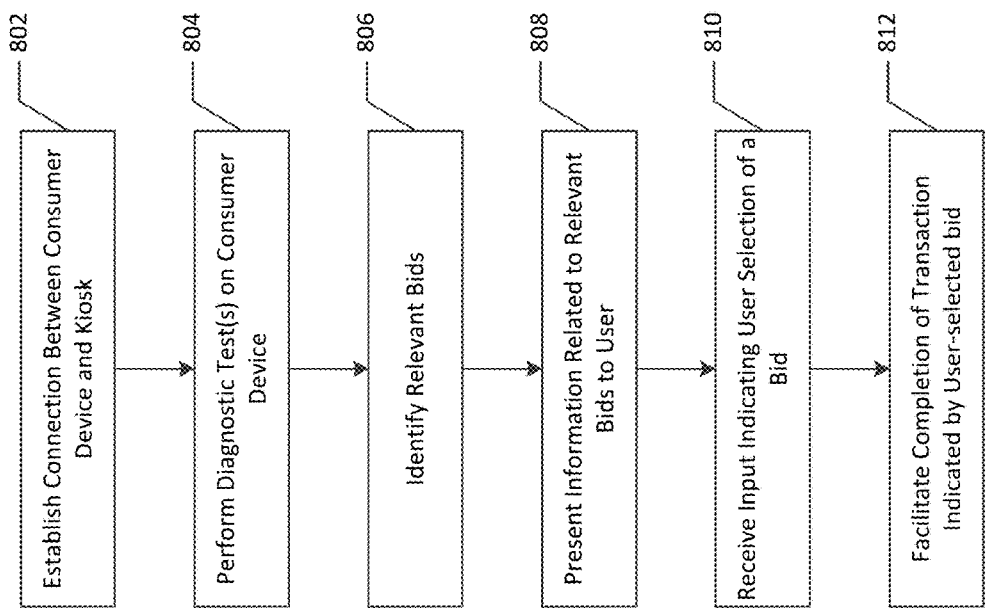

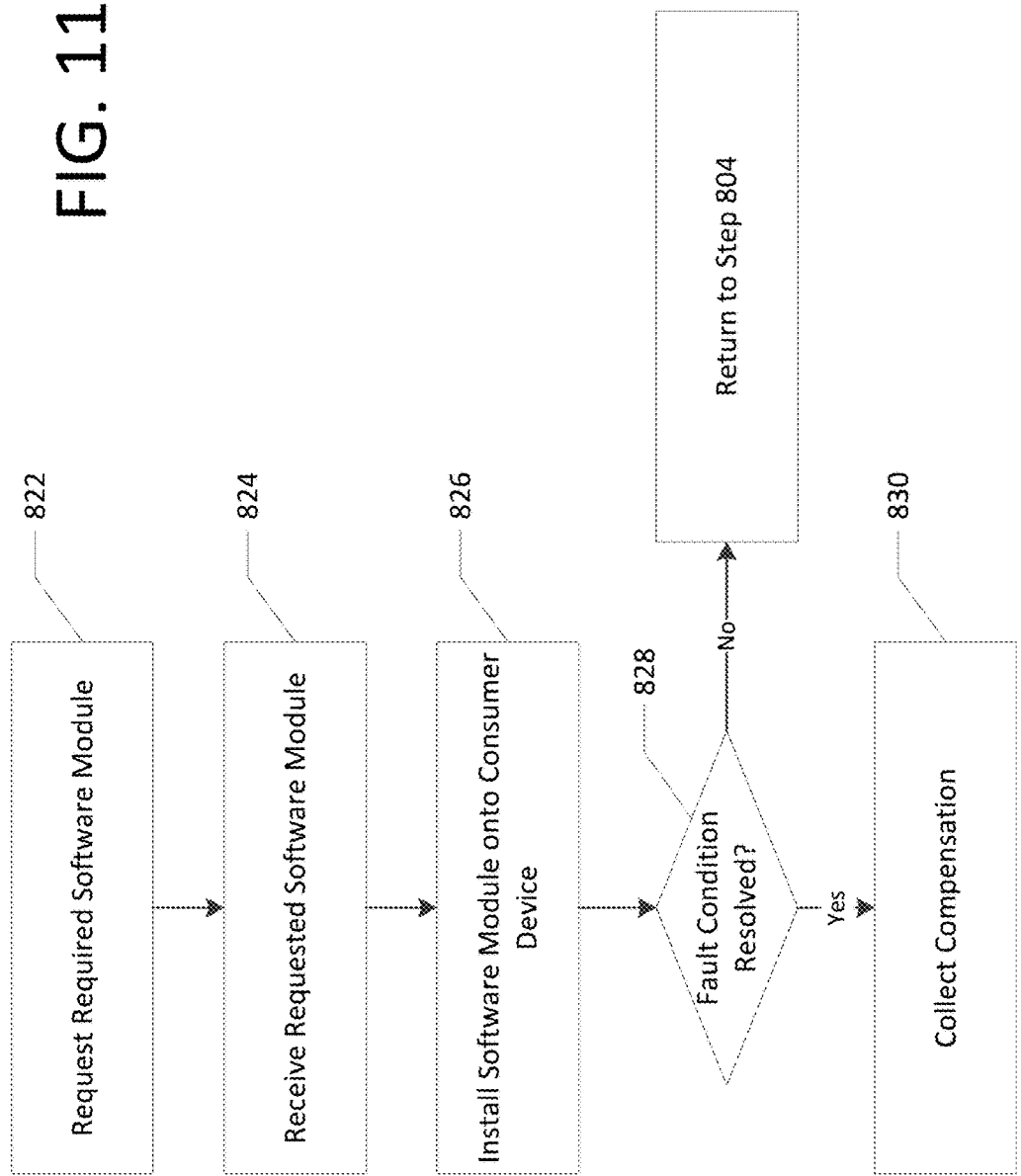

CONCEPTS FOR REPAIR AND SERVICE OF A CONSUMER DEVICE USING A NETWORK CONNECTION AND DIAGNOSTIC TEST

BACKGROUND

Embodiments of the present invention are generally related to providing users with after-market repair, service, sale, purchase, and/or trade-in options for after-market consumer assets. Embodiments of the present invention are also generally related to providing a method by which to leverage after-market consumer assets.

Consumer devices and other consumer assets often come with a limited warranty, life span, shelf life, and/or the like. In such instances, it may be difficult for the consumer to find reasonable and easily accessible options for servicing, replacing, returning, or disposing the items. Additionally, a consumer may wish to sell an item, either because the item is broken or for a variety of other reasons. Current tools provided to consumers selling after-market items are configured for consumer-to-consumer transactions. These concepts fail to guarantee the seller a competitive sales price and reduce the ability of service providers to leverage after-market consumer assets.

Therefore, there is a need for improved methods, systems, apparatuses, and computer program products for providing consumers with options for selling, returning, disposing, selling, repairing, and/or the like after-market items. Additionally, there is a need for improved methods, systems apparatuses, and computer program products that facilitate the leveraging of after-market consumer assets.

BRIEF SUMMARY

Various embodiments of the present invention provide methods, systems, apparatuses, and computer program products for facilitating a repair or purchase program. In various embodiments, service providers may submit one or more bids to repair or purchase a target item. A user may submit an item listing seeking to have an item repaired or seeking to sell an item. The user may then be presented with information related to one or more bids wherein the target item of the bid is the same or substantially the same as the item of the item listing. In some embodiments, at least one diagnostic test may be run on the item in order to determine the appropriate bids to present to the user. The user may then select a bid and receive instructions for completing the transaction indicated by the user-selected bid. In various embodiments, a common carrier (e.g., United Parcel Service, FedEx, etc.) may organize and/or manage such a repair or purchase program.

In one aspect of the present invention, a method for providing a user with after-market options for an item is provided. The method may comprise the steps of (a) receiving, via one or more processors, one or more bids for a target item prior to receiving a listing for an item; (b) after receiving the listing for the item, identifying, via the one or more processors, one or more of the bids that are relevant to the listing; (c) providing, via one or more processors, information associated with at least one of the one or more identified bids; (d) receiving, via one or more processors, a user selection of one of the one or more identified bids; and (e) providing, via one or more processors, instructions for completing a transaction indicated by the user's selection.

In another aspect of the present invention, a system for providing a user with after-market options is provided. The system may comprise one or more memory storage areas and one or more processors in communication with said one or more memory storage areas. The one or more processors are, collectively, are configured to (a) receive one or more bids for a target item prior to receiving a listing for an item; (b) store the one or more bids in the memory storage area; (c) after receiving the listing for the item, identify one or more of the bids that are relevant to the listing; (d) provide information associated with at least one of the one or more identified bids; (e) receive a user selection of one of the one or more identified bids; and (f) provide instructions for completing a transaction indicated by the user's selection.

In another aspect of the present invention, a computer program product for providing a user with after-market options is provided. The computer program product may comprise at least one non-transitory computer-readable storage medium having computer-readable program code portions stored therein. The computer-readable program code portions may be configured to, when executed by at least one processor, cause the processor to at least: (a) receive one or more bids for a target item, prior to receiving a listing for an item; (b) after receiving the listing for the item, identify one or more bids that are relevant to the listing; (c) provide information associated with at least one of the one or more identified bids; (d) receive a user selection of one of the one or more identified bids; and (e) provide instructions for completing a transaction indicated by the user's selection.

In another aspect of the present invention, a computer-implemented method for providing a user with after-market options is provided. The method may comprise the steps of: (a) receiving, via one or more processors, one or more bids for a target device; (b) establishing, via the one or more processors, a connection between a consumer device and a diagnostic device; (c) performing, via the one or more processors, at least one diagnostic test on the consumer device via the diagnostic device; (d) based at least in part on the results of the at least one diagnostic test, identifying, via the one or more processors, one or more bids that are relevant to the consumer device; (e) providing, via the one or more processors, information associated with at least one of the one or more identified bids; (f) receiving, via the one or more processors, a user selection of one of the one or more identified bids; and (g) facilitating, via the one or more processors, completion of the user's selection.

In another aspect of the present invention, a system is provided. The system comprises one or more memory storage areas and one or more processors in communication with the one or more storage areas. The one or more processors may be, collectively, configured to: (a) establish a connection with a consumer device; (b) perform at least one diagnostic test on the consumer device; (c) based at least on the results of the at least one diagnostic test, identify one or more bids that are relevant to the consumer device; (d) provide information associated with at least one of the one or more identified bids; (e) receive a user selection of one of the one or more identified bids; and (f) facilitate completion of the user's selection.

In yet another aspect of the present invention, a computer program product is provided. The computer program product may comprise at least one non-transitory computer-readable storage medium having computer-readable program code portions stored therein. The computer-readable program code portions may be configured to, when executed by at least one processor, cause the processor to at least: (a) establish a connection with a consumer device; (b) perform at least one diagnostic test on the consumer device; (c) based at least on the results of the at least one diagnostic test, identify one or more bids that are relevant to the consumer device; (d) provide information associated with at least one of the one or more identified bids; (e) receive a user selection of one of the one or more identified bids; and (f) facilitate completion of the user's selection.

BRIEF DESCRIPTION OF THE SEVERAL
VIEWS OF THE DRAWING(S)

Having thus described the invention in general terms, reference will now be made to the accompanying drawings, which are not necessarily drawn to scale, and wherein:

FIG. 5 illustrates one embodiment of a bid generator view of a service provider dashboard module, in accordance with the present invention;

FIG. 6 shows one embodiment of a transaction management view of a service provider dashboard module, in accordance with the present invention;

FIG. 7 illustrates one embodiment of an item listing generator view of a user dashboard module, in accordance with the present invention;

FIG. 10 is a flowchart illustrating an example process of providing a consumer with after-market options, in accordance with the system illustrated in FIG. 3; and FIG. 11 is a flowchart illustrating an example process for completing an immediate repair configured to resolve a software-related fault condition associated with a consumer device, in accordance with the present invention.

Figure 1:
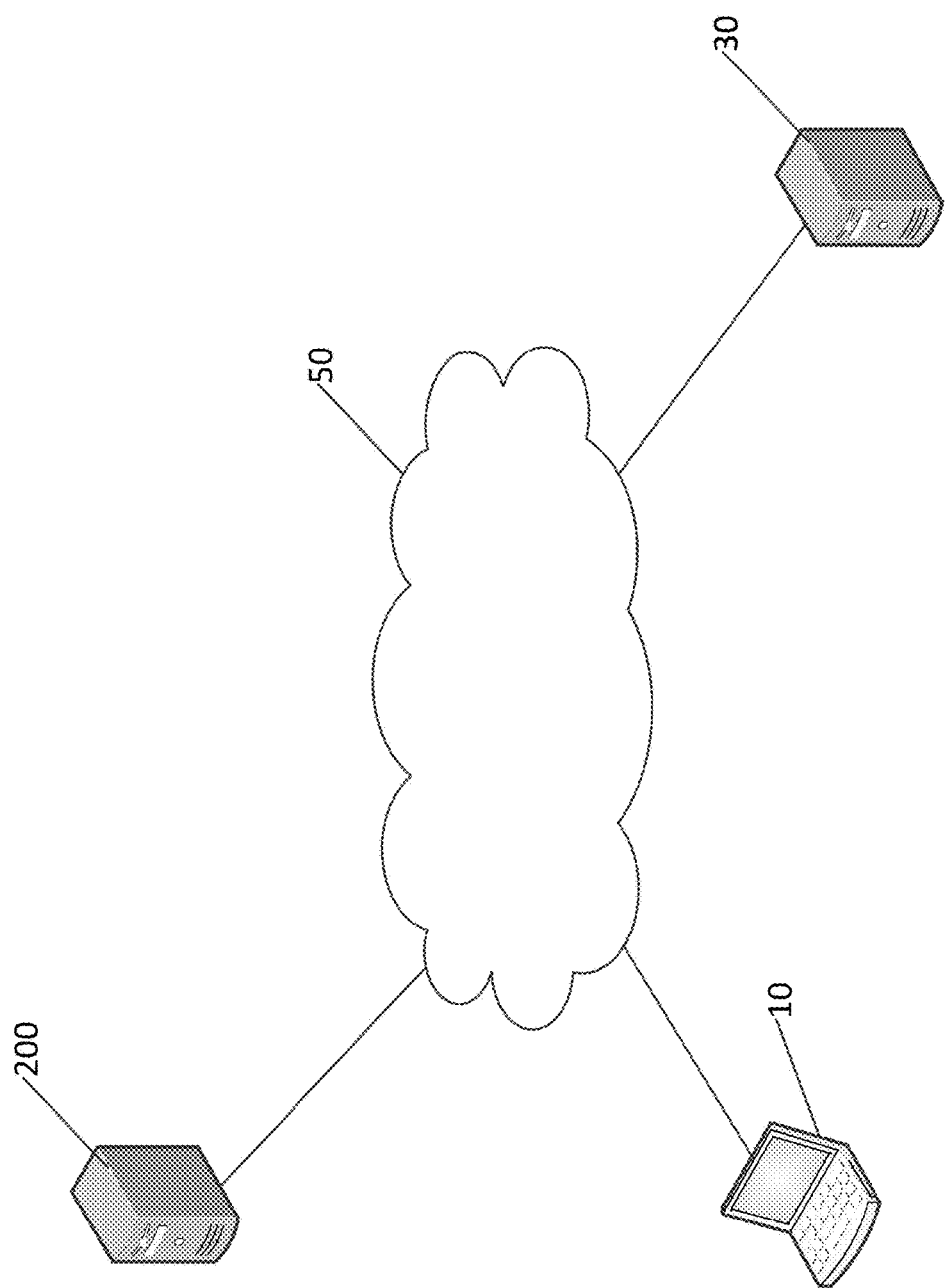
FIG. 1 illustrates one embodiment of a system for use in a repair or purchase program, in accordance with the present invention.

DETAILED DESCRIPTION OF VARIOUS
EMBODIMENTS

Embodiments, of the present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

I. Methods, Apparatus, Systems, and Computer Program Products

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. However, embodiments of the present invention may also take the form of an entirely hardware embodiment performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. General Overview

Embodiments of the present invention provide a repair/purchase/sales program that allows a service provider to submit a bid to purchase an item before it is offered for sale, the bid indicating the target item, one or more acceptable conditions for the target item, and a price the service provider is willing to pay for the target item. In some embodiments, a service provider may also submit a service bid indicating that the service provider is willing to repair a target item in one or more conditions for a predetermined compensation. Compensation may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, BlueTooth low energy (BLE), and various other contactless payment systems. Further, such payment technologies may include PayPal Beacon, Booker, Erply, Leaf, Leapset, Micros, PayPal Here, Revel, ShopKeep, TouchBistro, Vend, and/or the like. Such purchase and service bids may be received and stored for future use in a variety of settings. A user may submit an item listing indicating a particular item in a particular condition that the user would like to sell or have repaired. The user may then be provided with information associated with one or more of the stored bids that are relevant to the item listing (e.g., bids for which the target item of the bid is the same or substantially the same as the item of the item listing). The user may then select a bid and receive instructions for completing the transaction indicated by the user-selected bid. Various system architectures that may be used in accordance with embodiments of the present invention will now be described herein.

III. System Architecture

Repair or Purchase Embodiment

FIG. 1 illustrates one example embodiment of a system that may implement the present invention. The illustrated system includes one or more user computing devices 10, one or more after-market options servers 200, and one or more service provider systems 30. The one or more user computing devices 10, the one or more after-market options servers 200, and the one or more service provider systems 30 may communicate via one or more wired or wireless networks 50.

In various embodiments, a service provider system 30 may submit one or more purchase and/or service bids, each associated with a target item, to the after-market options server 200. The user computing device 10 may submit an item listing associated with an item to the after-market options server 200. The after-market options server 200 may then provide information associated with one or more relevant purchase and/or service bids to the user computing device 10. Upon receipt of input from the user, possibly via the user computing device 10, indicating a selection of one of the one or more purchase and/or service bids, the after-market options server 200 may facilitate the transaction indicated by the user-selected bid.

The after-market options server 200, user computing device 10, and the service provider system 30 will now each be discussed in detail below herein.

After-Market Options Server

Figure 2:
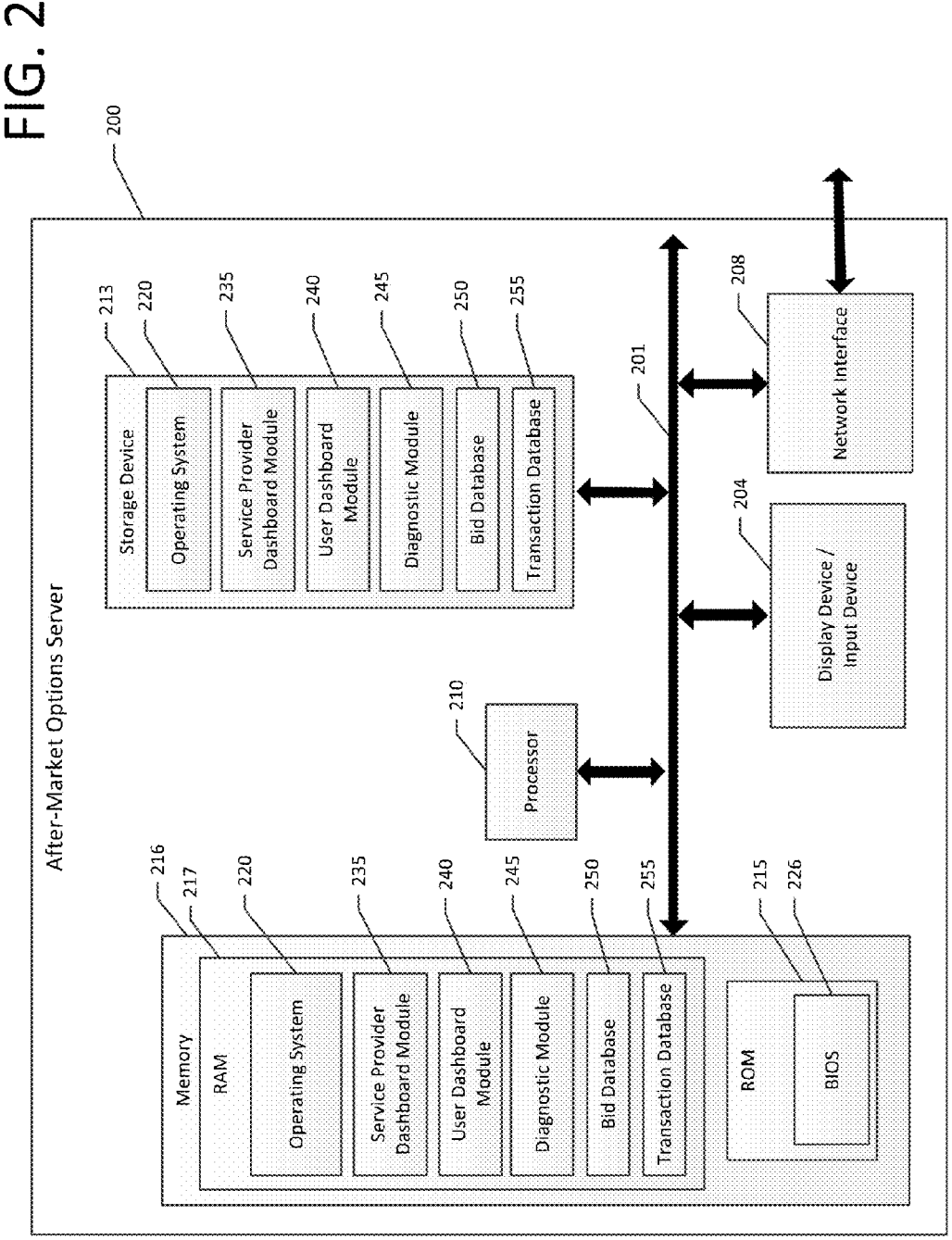
FIG. 2 is a schematic diagram of an after-market option system, in accordance with various embodiments of the present invention.

FIG. 2 provides a schematic diagram of an example after-market options server 200. The after-market options server 200 comprises a processor 210, such as one or more processing elements, which may include complex programmable logic devices (CPLDs), microprocessors, multi-core processors, coproces sing entities, application-specific instruction-set processors (ASIPs), and/or controllers or other processing devices or circuitry. The term circuitry may refer to an entirely hardware embodiment or a combination of hardware and computer program products. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present invention, such as the embodiments illustrated in FIGS. 4, 10, and 11, when configured accordingly. The processor 210 is used to execute software instructions for carrying out the defined steps of the method of the various embodiments of the present invention. The processor 210 communicates using a data bus 201 that is used to convey data and program instructions, typically, between the processor and memory 216.

The after-market options server 200 further includes memory 216, which may comprise non-volatile media (also referred to as non-volatile storage, memory, memory storage, memory circuitry and/or similar terms used herein interchangeably). In one embodiment, the non-volatile storage or memory may include one or more non-volatile storage or memory media as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/ or the like. In various embodiments, memory 216 includes both read only memory (ROM) 215 and random access memory (RAM) 217. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include the service provider dashboard module 235 and/or the user dashboard module 240. Example databases that, in various embodiments, may be stored in memory 216 are bid database 250, used to store purchase and service bids submitted by service providers, and transaction database 255, used to store data associated with pending and/or completed transactions. The term database, database instance, database management system, and/or similar terms used herein interchangeably may refer to a structured collection of records or data that is stored in a computer-readable storage medium, such as via a relational database, hierarchical database, and/or network database.

In at least one embodiment, the after-market options server 200 may further include or be in communication with volatile media (also referred to as volatile storage, memory, memory storage, memory circuitry and/or similar terms used herein interchangeably). In one embodiment, the volatile storage or memory may also include one or more volatile storage or memory media as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor 210. Thus, the databases, database instances, database management systems, data, applications, programs, program modules, scripts, source code, object code, byte code, compiled code, interpreted code, machine code, executable instructions, and/or the like may be used to control certain aspects of the operation of the after-market options server 200 with the assistance of the processor 210 and operating system 220, the service provider dashboard module 235, and/or the user dashboard module 240.

In various embodiments, memory 216 can be considered primary memory such as RAM memory or other forms which retain the contents only during operation, or it may be a non-volatile memory, such as ROM, EPROM, EEPROM, FLASH, or other types of memory that retain the memory contents. In some embodiments, the disk storage may communicate with the processor 210 using an I/O bus instead of a dedicated bus 201. The memory 216 could also be secondary memory, such as disk storage, that stores a relatively large amount of data. The secondary memory may be a floppy disk, hard disk, compact disk, DVD, or any other type of mass storage type known to those skilled in the computer arts. The memory may also comprise any application program interface, system, libraries and any other data by the processor to carry out its functions. ROM 215 is used to store a basic input/output system 226 (BIOS), containing the basic routines that help to transfer information between components of the after-market options server 200, including the after-market options module 230, the service provider dashboard module 235, the user dashboard module 240, the bid database 250, the transaction database 255 and/or the operating system 220.

In addition, the after-market options server 200 includes at least one storage device 213, such as a hard disk drive, a floppy disk drive, a CD-ROM drive, or optical disk drive, for storing information on various computer-readable media, such as a hard disk, a removable magnetic disk, or a CD-ROM disk. As will be appreciated by one of ordinary skill in the art, each of these storage devices 213 is connected to the system bus 201 by an appropriate interface. It is important to note that the computer-readable media described above could be replaced by any other type of computer-readable media known in the art. Such media include, for example, memory sticks (e.g., USB memories), magnetic cassettes, flash memory cards, digital video disks, and Bernoulli cartridges.

A number of program modules may be stored by the various storage devices and within RAM 217. Such program modules may include the operating system 220, the after-market options module 230, the service provider dashboard module 235, and/or the user dashboard module 240. Those skilled in the art will appreciate that other modules may be present in RAM 217 to effectuate the various embodiments of the present invention (e.g., diagnostic module 245, etc.). Furthermore, rather than program modules, the service provider dashboard module 235, and/or the user dashboard module 240 may comprise one or more stand-alone computers connectively coupled to the after-market options server 200.

Also located within the after-market options server 200 is a network interface 208 for interfacing and communicating with other elements of a computer network, such as by communicating data, content, information, and/or similar terms used herein interchangeably that can be transmitted, received, operated on, processed, displayed, stored, and/or the like. For instance, the after-market options server 200 may be in communication with one or more user computing devices 10 and/or one or more service provider systems 30. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the after-market options server 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols, wireless universal serial bus (USB) protocols, and/or any other wireless protocol.

Various information is input by a user or service provider to the after-market options server 200 via the network interface 208 and/or input/output device 204. This input information may include information related to purchase and/or service bids, item listings, pending transactions, completed transactions, or other information. This input information may vary, however, depending on the configuration and informational requirements of the after-market options server 200.

As mentioned above, the after-market options server 200 also includes an input/output device 204 for receiving and displaying data. The after-market options server 200 may include or be in communication with one or more input elements, such as a keyboard input, a mouse input, a touch screen/display input, audio input, pointing device input, joystick input, keypad input, and/or the like, as indicated by input/output device 204. The after-market options server 200 may also include or be in communication with one or more output elements, as indicated by input/output device 204, such as audio output, video output, screen/display output, motion output, movement output, and/or the like.

The after-market options server 200 is configured to facilitate transactions between a user and service provider. The after-market options server 200 may further be configured to receive and store one or more purchase and/or service bids associated with a target item from one or more service provider systems 30, receive an item listing from a user computing device 10, and identify one or more bids that are relevant based on a comparison of the target item of the bid and the item of the item listing. The after-market options server 200 may be further configured to provide the user with information related to the one or more relevant bids and receive input indicating a user selection of one of the one or more relevant bids, possibly via the user computing device 10. The after-market options server 200 may then provide instructions for completion of the transaction indicated by the user-selected bid and/or otherwise facilitate the completion of the transaction indicated by the user-selected bid.

Those skilled in the art will recognize that many other alternatives and architectures are possible and can be used to practice various embodiments of the invention. The embodiment illustrated in FIG. 2 can be modified in different ways and be within the scope of the invention. For example, one or more components of the after-market options server 200 may be located remotely from other after-market options server 200 components, such as in a distributed system. Furthermore, one or more of the components may be combined and additional components performing functions described herein may be included in the after-market options server 200. Thus, the after-market options server 200 can be adapted to accommodate a variety of needs and circumstances.

User Computing Device

In one embodiment, the user computing device 10 may include one or more components that are functionally similar to those of the after-market options server 200. For example, in one embodiment, the user computing device 10 may include one or more processing elements, one or more display device/input devices, volatile and non-volatile storage or memory, and/or one or more communications interfaces. The user computing device 10 may also comprise various other systems. In particular, the user computing device 10 may include components configured to submit an item listing to the after-market options server 200, receive and display information related to one or more bids, provide input indicative of a user selection of a bid, and/or the like. For example, the user computing device 10 may be a desktop computer, laptop, netbook, mobile computing device, tablet, smartphone, network-enabled game console, carrier-maintained kiosk, and/or the like. The user computing device 10 may be in communication with the after-market options server 200, and/or other computing devices.

Service Provider System

In one embodiment, the service provider system 30 may include one or more components that are functionally similar to those of the after-market options server 200. For example, in one embodiment, the service provider system 30 may include one or more processing elements, one or more display device/input devices, volatile and non-volatile storage or memory, and/or one or more communications interfaces. The service provider system 30 may also comprise various other systems. In particular, the service provider system 30 may include components configured to submit a service or purchase bid to the after-market options server 200, participate in a transaction with a user computing device 10, and/or the like. The service provider system 30 may be in communication with the after-market options server 200, and/or other computing devices.

Diagnostic Embodiment

Figure 3:
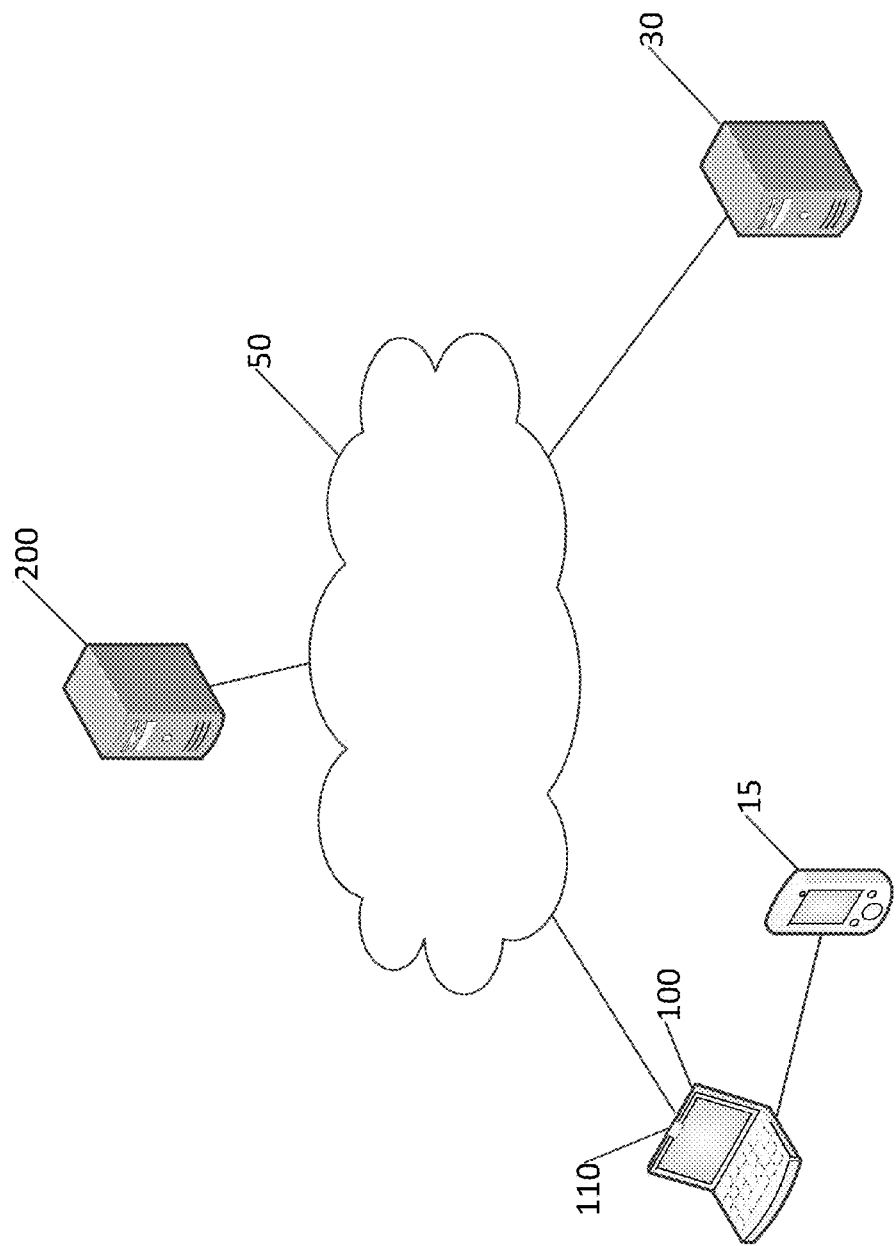
FIG. 3 illustrates another embodiment of a system for use in a repair or purchase program, in accordance with the present invention.

As noted above, FIG. 1 illustrates an example embodiment of a system that may implement embodiments of the present invention. Another example embodiment of a system that may implement embodiments of the present invention is shown in FIG. 3. In the embodiment illustrated in FIG. 3, the item of the item listing may be a consumer device 15. For example, the consumer device 15 may be a smartphone, PDA, handheld game, laptop, netbook, tablet, MP3 player, handheld computer, thumb drive, and/or the like. In this embodiment, a connection is established between the consumer device 15 and a diagnostic device 100. The diagnostic device 100 may be configured to conduct one or more diagnostic tests on the consumer device 15 and communicate with the after-market options server 200 via wired or wireless network 50. In various embodiments, the diagnostic device 100 may be a kiosk, the user computing device 10, or some other computing device. Various embodiments of the diagnostic embodiment may allow for instantaneous or near instantaneous repair of some issues that may be associated with the consumer device 15.

Diagnostic Device

In one embodiment, the diagnostic device 100 may include one or more components that are functionally similar to those of the after-market options server 200, the user computing device, and/or the like. For example, in one embodiment, the diagnostic device 100 may include one or more processing elements, one or more display device/input devices, volatile and non-volatile storage or memory, and/or one or more communications interfaces. The diagnostic device 100 may also comprise various other systems. In particular, the diagnostic 100 may include components configured to diagnose one or more software and/or hardware problems affecting a consumer device 15, request a software module for resolving a software issue with the consumer device 15, uninstall, reinstall, and/or install one or more software modules on the consumer device 15 to resolve a software issue, and/or the like. In various embodiments, the diagnostic device 100 may be configured to back up at least a portion of the data stored one the consumer device 15 before uninstalling, reinstalling, and/or installing a program module on the consumer device 15. The diagnostic device 100 may be in communication with the after-market options server 200, and/or other computing devices.

In various embodiments, the diagnostic device 100 is configured to establish a connection with a consumer device 15. In various embodiments, the diagnostic device 100 may be configured to establish a connection with the consumer device 15 via a wired network and/or direct wired connection. In various embodiments, the diagnostic device 100 may comprise at least one type-A USB socket such that a user may insert a USB cable into the diagnostic device 100 to connect the consumer device 15 to the diagnostic device 100. In some embodiments, the diagnostic device 100 may comprise one or more other types of sockets (e.g., a type B USB socket, a type A and/or B mini-USB socket, a type A and/or B micro-USB socket, 9 pin socket, and/or the like) configured to allow a user to plug-in a cable to the diagnostic device 100 in order to connect the diagnostic device 100 to the consumer device 15. In various embodiments, the diagnostic device 100 may comprise one or more cables that a user may plug into a corresponding socket on the consumer device 15. For example, the diagnostic device 100 may comprise one or more type-A USB cables (i.e., one or more cables terminating in a type-A USB connector), one or more Apple 30-pin docking cables, one or more type-A mini-USB cables, and/or the like.

In various embodiments, the diagnostic device 100 may be configured to establish a connection between the consumer device 15 and the diagnostic device 100 via a wired or wireless network/connection. For example, in some embodiments, diagnostic device 100 may be configured to establish a connection with the consumer device 15 via a local and/or short-range wireless protocol. In some embodiments, the diagnostic device 100 is configured to establish a connection with the consumer device 15 over a wireless personal area network (WPAN) (e.g., using Bluetooth™ techniques). In other embodiments, the diagnostic device may be configured to establish a connection with the consumer device 15 over a wireless network operating in accordance with any one or more of a number of second-generation (2G), 2.5G, third-generation (3G), and/or fourth-generation (4G) mobile communication protocols or the like, such as 2G wireless communication protocols IS-136 (TDMA), Global System for Mobile Communication (GSM), and IS-95 (CDMA), 2.5G wireless communication protocols GPRS, Enhanced Data GSM Environment (EDGE), 3G wireless communication protocols such as UMTS network employing WCDMA radio access technology. As yet another example, the diagnostic device 100 may be configured to establish a connection with the consumer device 15 via wireless networks employing techniques such as, for example, radio frequency (RF), Bluetooth™, infrared (IrDA), or any of a number of different wireless networking techniques, including Wireless LAN (WLAN) techniques.

In various embodiments, the diagnostic device 100 may further comprise a digital imaging component 110 configured to capture one or more digital images of the consumer device 15. In various embodiments, the digital imaging component 110 may be a digital camera, web cam, scanner, and/or the like. The diagnostic device 100 may be configured to capture and analyze one or more digital images to determine a physical condition associated with the consumer device 15. The image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. By analyzing the one or more captured digital images, the diagnostic device 100 may be able to determine if the consumer device 15 has a cracked screen, has markings indicating the consumer device 15 may have been dropped onto a hard surface, and/or the like.

In various embodiments, the diagnostic device may be configured to execute local modules similar to the user dashboard module 240, the diagnostic module 245, and/or the like. In other embodiments, the diagnostic device 100 may be configured to access the user dashboard module 240 and/or the diagnostic module 245 executing remotely on the after-market options server 200. In embodiments in which the diagnostic device 100 is within or is a kiosk, the kiosk may be located at a retail location associated with the carrier or some other location accessible to a user. Thus, in such embodiments, a user may approach the kiosk and a connection between the consumer device 15 and the kiosk may be established. In various embodiments, the kiosk may provide directions to the user as to how to establish the connection between the consumer device 15 and the kiosk. The kiosk may then access the diagnostic module 245 to perform an automatic diagnostic routine to determine any software or hardware issues related to the consumer device 15. In various embodiments in which the diagnostic device 100 is the user computing device 10 or some other computing device, the user may be provided directions to connect the consumer device 15 to the computing device. The user may then access the user dashboard module 240 via the computing device.

IV. Exemplary System Operation

As indicated above, various embodiments of the after-market options server 200 may operate various modules (e.g., modules 235, 240, and/or 245). In various embodiments, various modules (e.g., modules 235, 240, and/or 245) operating on the after-market options server 200 and/or other computing device may access, query, read, and/or write to various databases (e.g., databases 250 and/or 255). The service provider dashboard module 235 may be configured to provide a service provider with an interactive user interface for generating and editing bids; managing pending transactions; and/or the like. The user dashboard module 240 may be configured to provide a user with an interactive user interface for generating item listings; reviewing information related to selected bids; providing a bid selection; and facilitating completion of pending transactions. The user dashboard module 240 may be further configured to identify bids stored in the bid database 250 that are relevant to an item listing generated by the user. The diagnostic module 245 may be generally configured to conduct one or more diagnostic tests on a consumer device. The bid database 250 may be configured to receive and store one or more purchase and/or service bids submitted by one or more service providers, possibly via a service provider system 30. The transaction database 255 may be configured to store information related to one or more transactions. For example, the transaction database may store the item listing, the user-selected bid, and/or information related to the completion of the transaction indicated by the user-selected bid. As should be appreciated, various embodiments may combine the functionality of the modules 235, 240, 245 and/or the databases 250, 255 or may substitute one or more modules 235, 240, and/or 245 and/or databases 250, 255 for other methods to incorporate the functionality described herein with respect to the modules 235, 240, 245 and databases 250, 255. Modules 235, 240, and 245 will now be discussed in more detail with respect to FIGS. 4-11.

Service Provider Dashboard

In various embodiments, the service provider dashboard module 235 may be configured to run on (e.g., be executed by) the after-market options server 200 and display a graphical user interface on the service provider system 30 via a web browser, a dedicated window, or some other method. In some embodiments, the service provider dashboard module 235 may run on the service provider system 30. In various embodiments, the service provider dashboard module 235 is configured to access, query, and/or write to the bid database 250 and/or the transaction database 255. The service provider dashboard module 235 may be configured to provide a service provider with an interactive graphical user interface for guiding a service provider in the generation of one or more service and/or purchase bids, to facilitate management of a service providers bids, open transactions, completed transactions, and/or the like.

In various embodiments, a service provider may be a manufacturer (e.g., Dell, Apple, or the like), retailer (e.g., BestBuy, Target, or the like), repair service (e.g., Geek Squad or the like) and/or other organization, company or the like wishing to purchase or provide repairs for after-market items. In various embodiments, the service provider may access the repair or purchase program to increase consumer awareness of offered services, leverage consumer assets, and/or the like. In the embodiment illustrated in FIG. 4, one or more service providers (e.g., operating one or more service provider systems 30) may submit one or more service and/or purchase bids via the service provider dashboard module 235. The one or more submitted bids may be received and/or stored in the bid database 250 at step 402.

FIG. 5 illustrates an example screen shot of a bid generator 500 provided via the service provider dashboard 235. The bid generator 500 may be configured to receive input from a service provider, possibly via service provider system 30, indicating that the service provider would like to generate a purchase or service bid for one or more items.

The bid generator 500 may be configured to receive input from a service provider (e.g., through a service provider system 30) indicating a purchase/service bid indicator 514. The purchase/service bid indicator 514 may be configured to allow a service provider to indicate whether the bid is a service or purchase bid. If the bid is a service bid, the service provider may be offering to provide a service, such as completing a particular type of repair for one or more target items or the like. If the bid is a purchase bid, the service provider may be offering to buy one or more target items.

The bid generator 500 may be configured to receive input 512 indicating a particular target item to which the bid pertains. For example, in some embodiments, the target item may be a smartphone, laptop, wrench set, and/or the like. The bid generator 500 may also be configured to receive input 520 indicating a make or brand of the target item (e.g., Apple, Dell, Snap-in Tools), input 522 indicating a model of the target item (e.g., iPhone 3G, Inspiron 9300, 6" Adjustable Widemouth Wrench), and/or input 524 indicating a year or range of years the target item was manufactured (e.g., 2008, 2005-2007, 2010-present). In some embodiments, the target item is a specific target item (e.g., a Samsung Galaxy S4, or the like).

In various embodiments, the bid generator 500 may be configured to receive input 516 indicating a condition of the target item. For example, a service provider may be interested in buying a target item that is in new, like new, or good condition, but not interested in purchasing a target item that is in fair or poor condition. In some embodiments, the service provider (e.g., operating a service provider system 30 or the like) may also enter a description of the repair or symptoms of the issue that may indicate that the repair indicated by the repair bid is needed.

In some embodiments, the bid generator may also be configured to receive input 518 from a service provider (e.g., operating a service provider system 30 or the like) indicating one or more geographical regions from which they are interested in repairing or purchasing target items. For example, a service provider may only offer to repair target items from users within the state of Oregon, users within the Pacific Northwest, or users west of the Mississippi River. Other areas may be defined in terms of area codes, zip codes, cities, counties, states, provinces, countries, and/or the like. In another example, a service provider may not want to purchase target items from users who live with 50 miles of the ocean because the salt air may have a negative effect on the target item. In various embodiments, a service provider may provide a region from which they are willing or are not willing to repair/service and/or purchase target items from via a map.

The bid generator 500 may be further configured to receive input 526 from the service provider (e.g., operating a service provider system 30 or the like) indicating, in the case of a purchase bid, a compensation the service provider is offering to provide to the user in exchange for the item, or, in the case of a service bid, a compensation the service provider is requesting in exchange for providing the indicated service. In some embodiments, the bid generator 500 may be configured to receive input 528 indicating that the service provider is willing to beat any competing bid by a certain amount (e.g., $0.50, $1, $5, or the like). Thus, if there are two competing bids to purchase a target item, and service provider B has indicated that they would like to beat any competing bid by $2, when the one or more bids are presented to a user, service provider B's bid will be $2 more than service provider A's bid. Similarly, if there are two competing bids to perform a particular repair for an item, and service provider B has indicated that they would like to beat any competing bids by $2, when the one or more bids are presented to a user, service provider B's bid will indicate that service provider B is willing to perform the repair for $2 less than service provider A. In various embodiments, a service provider may be able to supply input to the bid generator 500 indicating a minimum or maximum bid the service provider is willing to compensate a user for the target item or is willing to be compensated for a certain repair of the target item. As will be recognized, a variety of other approaches and techniques can be used to adapt to various needs and circumstances.

In various embodiments, the bid generator 500 is also configured to receive input from the service provider (e.g., operating a service provider system 30 or the like) indicating a time frame for completing a repair of a target item. For example, if a service bid is for fixing the screen on a particular smartphone, the service provider may indicate that the service provider will complete the repair within 24 hours of receiving the user's smartphone, within three days of receiving the user's smartphone, that the user's smartphone will be repaired and returned to the user within one week, and/or the like.

In various embodiments, the bid generator 500 may be configured to receive input from a service provider (e.g., operating a service provider system 30 or the like) indicating a frequency or total number of times the service provider is willing to provide the service or purchase the target item indicated by the bid. For example, a service provider may only wish to purchase ten of a particular target item. In another example, the service provider may wish to only provide a particular repair of a target item forty times per week, per month, per quarter, and/or the like.

In various embodiments, the bid generator 500 may be configured to receive input 530 indicating an address an item should be shipped to for service or for the service provider to take possession of the item. The service provider may also be configured to receive input indicating shipping preferences of the service provider. In another embodiment, the kiosk may include a drop box or storage area into which items can be placed.

In various embodiments, the bid generator 500 may be configured to automatically fill in particular portions of the bid based on stored service provider preferences. For example, if a service provider only wishes to purchase or service items from users living in the state of Oregon, every time the service provider opens the bid generator 500, the bid generator 500 may automatically indicate that the service provider only wishes to service or purchase items from user's living in Oregon. In some embodiments, the service provider's shipping address and/or shipping preferences may be automatically filled in and/or the like.

Once a service provider has provided all of the relevant input for the service or purchase bid into the bid generator 500, the service provider (e.g., operating a service provider system 30 or the like) may select the submit button 532. After the service provider has selected the submit button 532, or possibly in response thereto, the service provider dashboard may submit the bid to the bid database 250. In various embodiments, the bid may be stored in association with a bid identifier configured to uniquely identify the bid, corresponding service provider, and/or the like.

In various embodiments, the service provider dashboard module 235 may be configured to query the bid database 250 for similar bids (i.e., bids for the same or substantially the same target item and/or repair). The frequency with which the identified similar bids are selected by a user may also be determined by querying the bid database 250 and/or transaction database 255. The bid generator 500 may then provide the service provider (e.g., via a service provider system 30 or the like) with an indication of how likely the submitted bid is to be selected by a user based on the identified similar bids, user bid selection history for the identified similar bids, and/or the like. The service provider may be offered the opportunity to return to the bid generator 500 to edit the submitted bid.

In various embodiments, the service provider dashboard module 235 may be configured to allow a service provider (e.g., operating a service provider system 30) to manage one or more service and/or purchase bids that were previously submitted by the service provider. The service provider dashboard module 235 may be configured to allow a service provider to withdraw a bid and/or edit a bid. For example, if a service provider entered a bid to buy 100 smartphones a week, but they no longer wish to buy smartphones, they service provider may choose to withdraw the bid. If the service provider would like to continue buying smartphones, but would only like to purchase 100 smartphones a month or would like to narrow the types of smartphones the service provider would like to purchase to only Samsung smartphones, the service provider may choose to edit the bid. Additionally, the service provider dashboard module may be configured to allow a service provider to edit a repair description, condition indicator, location preferences, ship-to address, drop location, and/or the like for one or more service and/or purchase bids.

In various embodiments, the service provider dashboard module 235 may be further configured to facilitate the management of a service provider's bids, open transactions, completed transactions, and/or the like. FIG. 6 illustrates an example screen shot of a transaction manager 550. For example, a transaction manager 550 may provide a list of the service provider's open and/or completed transactions to the service provider via a service provider system 30 or the like. In some embodiments, at least some of the information displayed by the transaction manager 550 is stored in the transaction database 255. As shown in FIG. 6, in various embodiments, the transaction manager 550 may display a transaction identifier 552 configured to uniquely identify the transaction. The transaction manager 550 may also display a bid identifier 554 configured to identify the user-selected bid that initiated the transaction. In various embodiments, the transaction manager 550 may list a date 556 when the transaction was initiated (i.e., when the user selected the bid).

A type of transaction 558 may also be listed in the transaction manager 550. In some embodiments, the type of transaction 558 may simply indicate whether the transaction is a purchase or service transaction. In other embodiments, the type of transaction 558 may indicate what type of repair is associated with the transaction (e.g., hardware repair, software repair, replace battery, etc.), and/or other information that may be used to classify the transaction.

In various embodiments, the item associated with the transaction 560 may be indicated by the transaction manager 550. In some embodiments, the item associated with the transaction 560 may indicate a category associated with the item (e.g., smartphone), the make (e.g., Apple), model (e.g., iPhone 4), and/or year associated with the item (e.g., 2010), the serial number of the item, and/or the like. Thus, the item associated with the transaction 560 may include information specific to the item (e.g., a unique serial number) and/or a general description (e.g., an iPhone 4 or a smartphone). In some embodiments, the generality and/or specificity of the item associated with the transaction 560 listed in the transaction manager 550 may depend on the service provider profile preferences.

In various embodiments, the transaction manager 550 may also include a status 562 of the transaction. Thus, the transaction manager 550 may indicate if the user has shipped the item or not; if the item has been received by the service provider or not; if the repair is pending, in progress, complete, and/or the like; if the service provider has shipped the repaired item to the user or not; if the user has received the repaired item; if the service provider has provided compensation for the purchased item or not; if the service provider has received compensation for the repair or not; if the transaction is complete; and/or the like. Thus, the transaction manager 550 may facilitate the service provider managing a variety of transactions.

User Dashboard

In various embodiments, the user dashboard module 240 may be configured to run on the after-market options server 200 and display a graphical user interface on the user computing device 10 via a web browser, a dedicated window, or some other method. In some embodiments, the user dashboard module 240 may run on the user computing device 10 or the diagnostic device 100. In various embodiments, the user dashboard module 240 is configured to access, query, and/or write to the bid database 250 and/or the transaction database 255. The user dashboard module 240 may be configured to provide a graphical interactive user interface to guide a user in the generation of an item listing, selecting a bid, managing of open and/or completed transactions, and/or the like. In various embodiments, the user dashboard module 240 may be configured to identify one or more bids that are relevant to an item listing generated by a user.

Returning to FIG. 4, at step 404, an item listing may be received. In various embodiments, the user dashboard module 240 may be configured to guide a user (e.g., operating a user computing device 10, diagnostic device 100, or the like)

in the generation of an item listing. FIG. 7 illustrates an example screen shot of an embodiment of an item listing generator 700. In various embodiments, the item listing generator 700 is configured to receive input from a user associated with an item and an item listing. The item listing generator 700 is configured to receive the input necessary to identify purchase and/or repair bids stored in the bid database 250 that are relevant to the item. In various embodiments, the item listing generator 700 may prompt the user to enter input similar to the input discussed in association with the bid generator 500. For example, the item listing generator 700 may be configured to receive input 712 indicating an item. Various embodiments of the item listing generator 700 may further be configured to receive inputs 720, 724, and/or 726 indicating a make, model, and/or year of the item. In some embodiments, the item listing generator 700 may be configured to receive input 714 indicating whether the user would like to sell the item or have the item repaired. In various embodiments, the item listing generator 700 may be configured to receive input 718 indicating a location of the user. In various embodiments, the item listing generator 700 may be configured to receive input 716 indicating a condition of the item. If the user would like to have the item repaired, the item listing generator 700 may prompt the user to enter input 715 describing the issue the user is experiencing with the item and/or the repair the user would like to have completed. In various embodiments, in addition to and/or in place of prompting a user to enter input 715, the user dashboard module 240 may call a diagnostic module 245 to conduct one or more diagnostic tests on the item and/or the user may be asked to fill out an electronic questionnaire regarding the issue the user is experiencing with the item to determine the appropriate repair for the item. In various embodiments, the user may be prompted to select one or more repairs and/or issue symptoms from a list. Once the user has provided the necessary input, the user may select the submit button 732 to submit the item listing.

Returning to FIG. 4, after the item listing has been received, or perhaps in response thereto, the user dashboard module 240 may identify one or more bids that are relevant to the item listing, at step 406. The relevant bid(s) may be identified from the bids stored in the bid database 250. A bid may be relevant to the item listing if the item, make, model, and/or year, or a combination thereof of the item listing is the same or substantially the same as the target item, make, model, and/or year, or a combination thereof, of the bid. For example, in various embodiments, an item listing for an "iPhone 3G" may be relevant to a bid wherein the target item is an "Apple iPhone." In other embodiments, a bid may be relevant to an item listing if the item, make, model, and/or year is the same or substantially the same as the target item, make, model, and/or year, or a combination thereof, of the bid and the item condition and/or geographic location indicated by the item listing matches the target item condition and/or target geographic location indicated in the bid. For example, if the target item of a bid is a "Kindle" with a target condition of "like new" or "good", the bid would be relevant to an item listing wherein the item is a "Kindle Fire HDX 7" in good condition. In various embodiments, a variety of algorithms may be used to identify bids that are relevant to an item listing.

In some embodiments, if no relevant bids are stored in the bid database 250, the item listing may be stored in the transaction database 255. In such embodiments, if a bid is received that is relevant to the item listing, the user may be notified. In other embodiments, if there are no relevant bids stored in bid database 250, the item listing is not stored and the user is notified that there are currently no bids that are relevant to the user's item listing, but that there may be at some later point in time.

Figure 8:
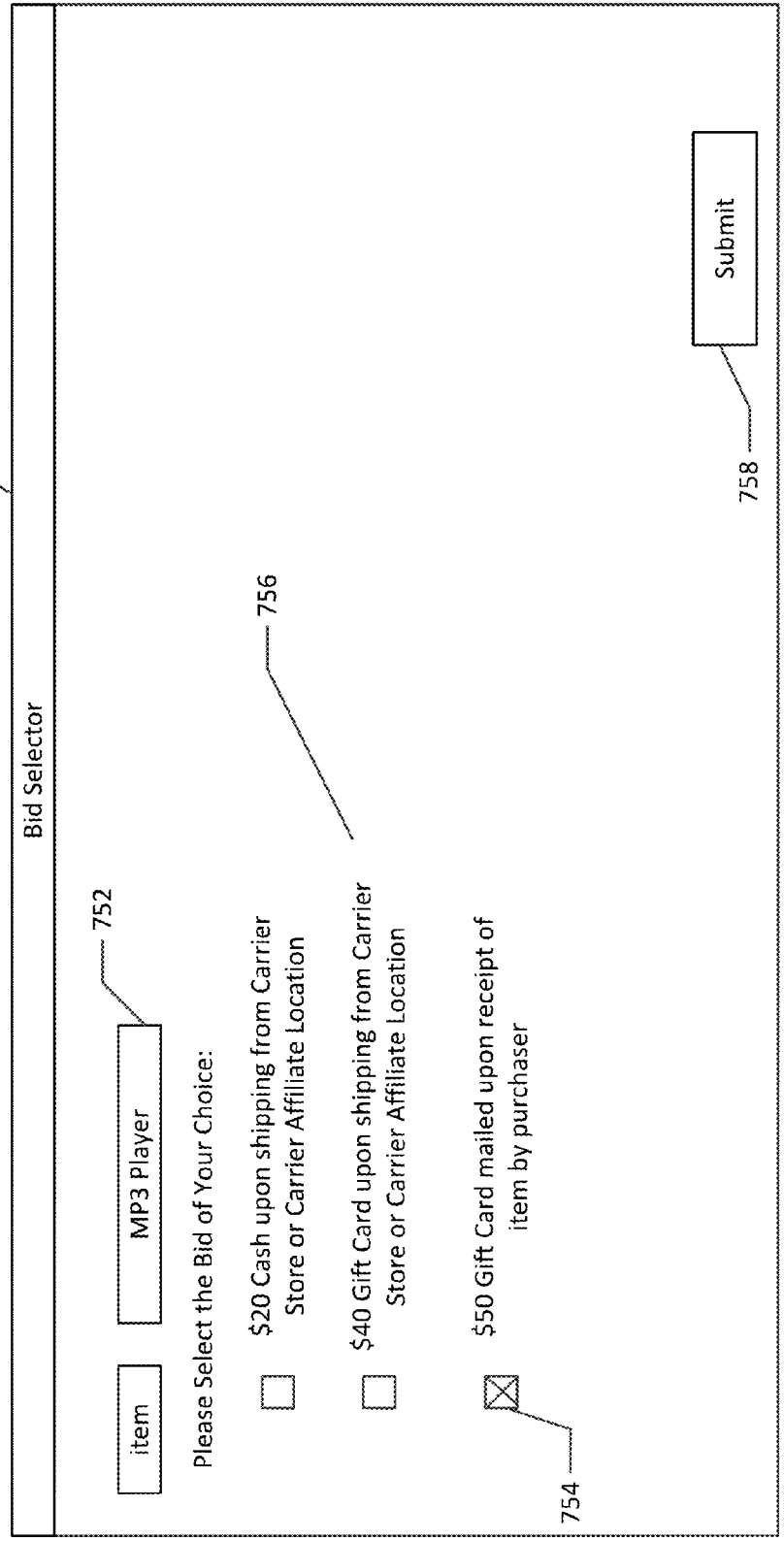
FIG. 8 illustrates one embodiment of a bid selector view of a user dashboard module, in accordance with the present invention.

At step 406, after identifying one or more relevant bids, or perhaps in response thereto, the user dashboard module 240 may provide information associated with one or more of the identified relevant bids (e.g., display information on a monitor associated with the user computing device 10, diagnostic device 100, or the like). FIG. 8 shows an example screen shot of a bid selector 750 view of the user interface provided by the user dashboard module 240. In various embodiments, the bid selector 750 may display at least some of the information identifying the item 752 provided by the user. In some embodiments, the bid selector 750 may display a stock picture of the item associated with the item listing. The bid selector 750 may be configured to display information 756 associated with one or more identified relevant bids. For example, the screen shot shown in FIG. 8 displays information related to three relevant purchase bids.

Figure 4:
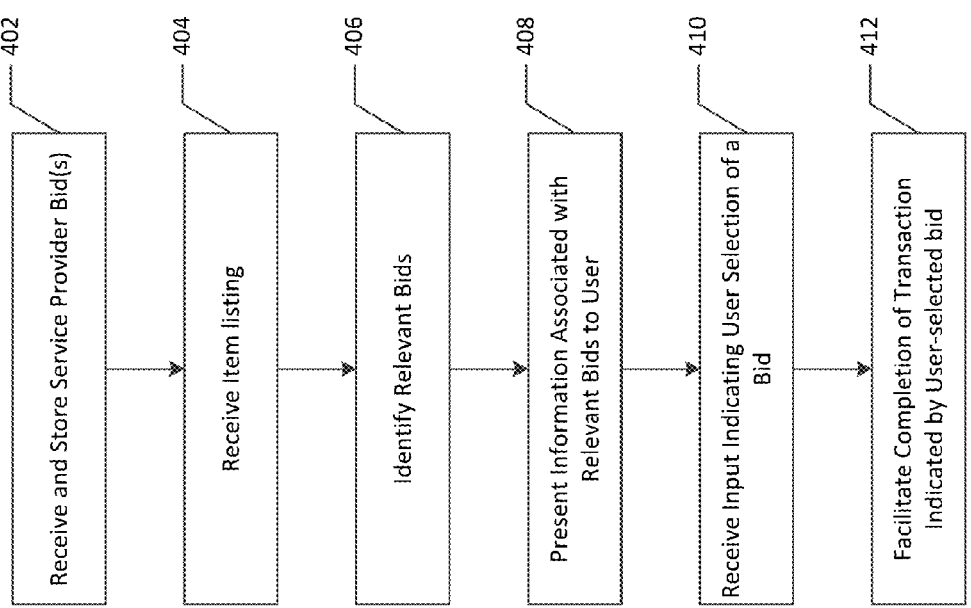
FIG. 4 is a flowchart illustrating an example process of providing a consumer with after-market options, in accordance with various embodiments of the present invention.

At step 410, as shown in FIG. 4, input indicating the user selection of a bid may be received (e.g., via a user computing device 10, diagnostic device or the like operated by the user). In various embodiments, the user-selected bid is one of the identified relevant bids. In the example embodiment shown in FIG. 8, the bid selector 750 may be configured to receive input from a user indicating a user selection of a bid. For example, the user may select selection box 754 and then select the submit button/icon 758. In other embodiments, the user may select a radio button and then select a submit or continue button/icon. In yet other embodiments, a user may select the information associated with the bid to select the bid or to receive additional information related to the bid. In such embodiments, the screen displaying the additional information related to the bid may contain a "select this bid" button or the like. As will be appreciated, the user may provide input indicating the selection of a bid in a variety of ways in various embodiments.

At step 412 and as shown in FIG. 4, the user dashboard module 240 may facilitate the completion of the transaction indicated by the user-selected bid. For example, instructions may be presented to the user (e.g., operating a user computing device 10, diagnostic device 100 or the like) regarding how to complete the transaction indicated by the user-selected bid, possibly via the user dashboard module 240 or via another method. In some embodiments, the user may be provided with a printable shipping label that may be printed and taken, with the item, to a retail location associated with the carrier associated with the repair or purchase program. The item may then be shipped to the service provider indicated by the user-selected bid for repair/service and/or for the service provider to take ownership of the item, as appropriate. In some embodiments, the user may be provided a transaction identification number to take, with the item, to a retail location associated with the carrier so that the item may be shipped to the service provider.

Figure 9:
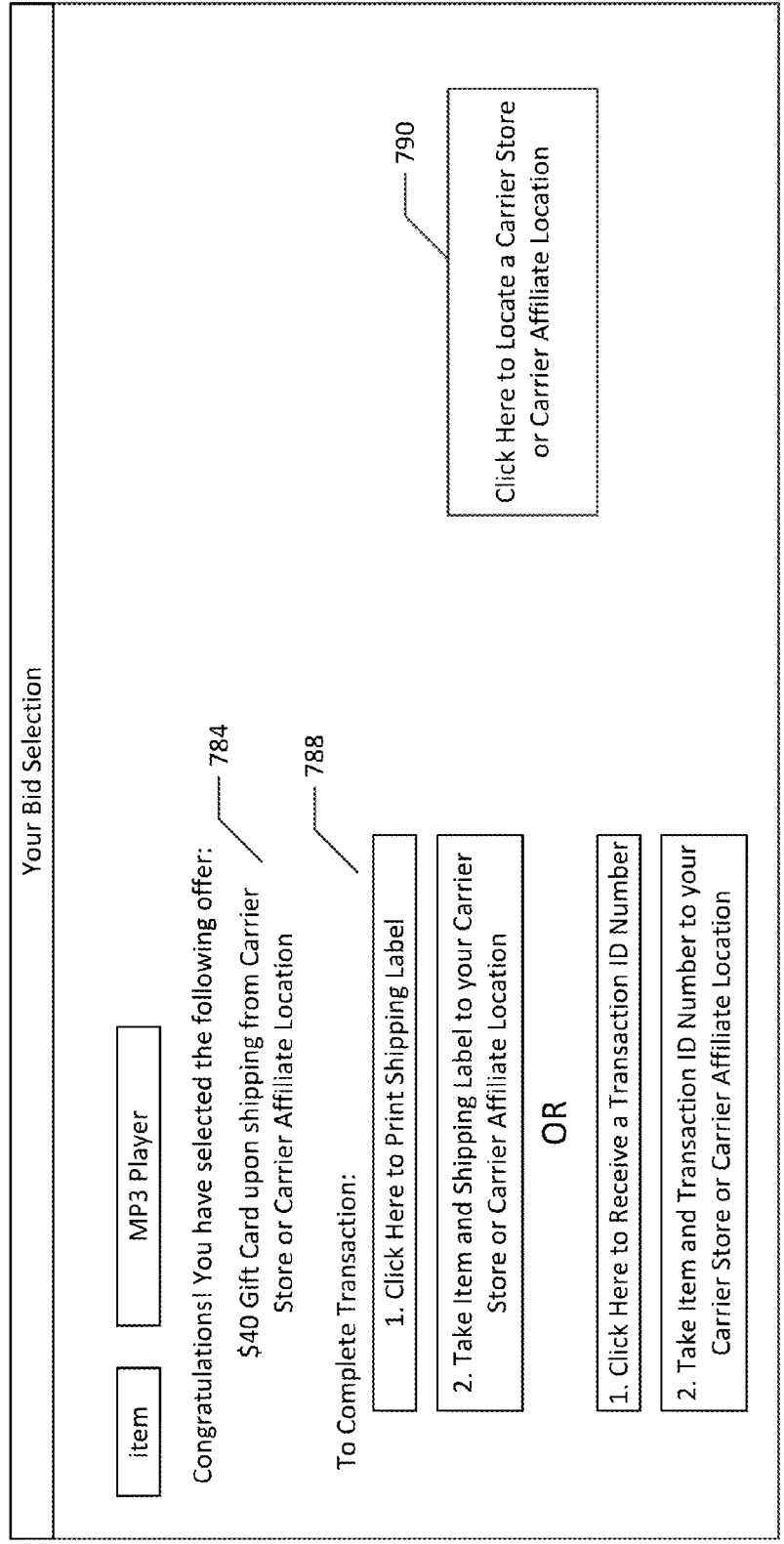
FIG. 9 shows one embodiment of a bid confirmation view of a user dashboard module, in accordance with the present invention.

FIG. 9 shows an example bid confirmation page that may be displayed to a user (e.g., operating a user computing device 10, diagnostic device 100, or the like), after the bid selection is received, or perhaps in response thereto. The bid confirmation page may be configured to confirm the user's selection of the user-selected bid, request additional information from the user (e.g., payment information, return shipping address, and/or the like), and/or provide the user with instructions for completing the transaction. For example, the bid confirmation page shown in FIG. 9 displays information associated with the user-selected bid 784 to confirm the user's selection of the bid. Instructions for completing the transaction 788 are also provided on the example bid confirmation page. Additionally, the bid confirmation page may provide the user with a link to store locator 790, or the like, configured to identify one or more retail locations associated with the carrier in the vicinity of the user. The user may then take the item to one of the identified retail locations associated with the carrier to ship the item to the service provider.

In various embodiments, after a user has selected a bid, or perhaps in response thereto, the user dashboard module 240 may generate a unique transaction identification number (transaction ID) configured to identify the transaction. The unique transaction ID, information related to the user, and information related to the user-selected bid and/or the service provider indicated by the user-selected bid, and/or other information related to the transaction, may be stored in the transaction database 255.

In various embodiments, after a bid is selected, the user dashboard module 240 may update bid database 250. For example, an indicator that user-selected bid was selected at a specific date may be stored in association with the user-selected bid. For example, in various embodiments, a service provider may indicate that they only wish to purchase one hundred of a particular item each month. Thus, after the user has selected the bid indicating that the user is going to sell the item to the service provider in accordance with the purchase bid, a tally mark or the like may be recorded in the bid database 250, the transaction database 255, or the like, so that the user dashboard module 240 may determine when the quota for a particular bid has been reached. In some embodiments, if a bid has reached an associated quota, information related to the bid may not be provided to users for at least some period of time. For example, if the quota associated with the bid is a weekly quota, the information related to the bid may not be provided to a user until the beginning of the following week. In various embodiments, the service provider may be informed of the transaction indicated by the user-selected bid, possibly via the service provider dashboard module 235, email, or any other suitable communication method.

In various embodiments, the compensation indicated by the user-selected bid may be in U.S. dollars, Euros, Yen, or some other currency including digital currency, store credit, gift cards, coupons, points, frequent flyer miles, charitable donations, loyalty points, and/or some other form of payment. In some embodiments, the user dashboard module 240 may be configured to debit and/or credit an account associated with the user and/or the service provider indicated by the user-selected bid. In some such embodiments, the user dashboard module 240 may be configured to receive payment information from the user, such as credit card information and/or the like. In some embodiments, the user dashboard module 240 may be configured to facilitate mailing, shipping, and/or delivering a check, gift card, or other form of compensation to a user specified address, an address stored in a user profile associated with the user, and/or the like. In various embodiments, the user may be instructed to bring the item to a retail location associated with the carrier to ship the item to the service provider so that the service provider may repair or take possession of the item. In such embodiments, the user may receive or provide compensation at the retail location associated with the carrier or may receive or provide compensation at a later time, as indicated by the user-selected bid. In various embodiments, the user may be instructed to place the item in a drop box located at a diagnostic kiosk or other kiosk associated with the repair or purchase program. In some embodiments, the user may be compensated immediately, after appropriate inspection of the item, and/or after that lapsing of a predetermined time period.

The user dashboard module 240 may be configured to facilitate the transaction from initiation (e.g., a user selecting a bid) to completion of the transaction. In various embodiments, the transaction indicated by the user-selected bid may be considered completed when the repaired item has been returned to the user, the service provider has taken possession of the item, the service provider has received payment for services provided and/or the user has received payment for the item, and/or the like.

In various embodiments, the user dashboard module 240 may be further configured to provide the user with a transaction manager similar to that discussed above with respect to the service provider dashboard module 235 and FIG. 6. Thus, the user dashboard module 240 may be configured to facilitate a user managing one or more open and/or completed transactions (e.g., via a user computing device 10, diagnostic device 100, or the like).

In some embodiments, the user dashboard module 240 may be configured to request feedback related to the transaction from the user upon the completion of the transaction. Thus, in some embodiments, a service provider may be associated with a rating. The service provider rating may be displayed alongside the information associated with a bid that is displayed to a user. This may be particularly relevant for service bids. For example, when information associated with a service bid is presented to a user, a service provider rating may also be presented to the user alongside the information associated with the service bid indicating the satisfaction level of various users who have selected service bids associated with the service provider. The rating may be an average rating from other users and/or written reviews from other users regarding the quality of the repair offered by the service provider, whether the service provider completed the repair within the time period indicated by the service bid, and/or the like.

In some embodiments, the user dashboard module 240 may be further configured to call the diagnostic module 245 to perform one or more diagnostic tests on an item before providing the user with information related to one or more relevant bids. Use of the diagnostic module 245 may be particularly useful when the item is a consumer device (e.g., an electronic device such as a laptop, netbook, MP3 player, cell phone, PDA, tablet, e-reader, smartphone, etc.) The diagnostic module 245 will now be described in detail.

Diagnostic

In various embodiments, the diagnostic module 245 is configured to conduct one or more diagnostic tests on an item such as the consumer device 15 (e.g., an electronic device such as a laptop, netbook, MP3 player, cell phone, PDA, tablet, e-reader, smartphone, etc.). The diagnostic module 245 may be configured to run on the after-market options server 200 (and/or various other computing entities) to provide diagnostic information related to a consumer device in communication with a diagnostic device 100 which may be remote from the after-market options server 200. In some embodiments, the diagnostic module 245 may be configured to run on the diagnostic device 100 and/or access one or more diagnostic databases stored on or in communication with the after-market options server 200. In various embodiments, the diagnostic module 245 may be further configured to manage a software repair of one or more software modules associated with the consumer device 15. The diagnostic module 245 will now be discussed in more detail with regard to FIG. 10.

FIG. 10 is a flowchart illustrating an example process that may be completed by an embodiment of the present invention employing a diagnostic module 245. At step 802, a connection may be established between the consumer device 15 and the diagnostic device 100. In some embodiments, the user may be provided directions for establishing the connection. In some such embodiments, the instructions are provided via the user dashboard module 240.

At step 804, one or more diagnostic tests may be performed on the consumer device 15. In various embodiments, the one or more diagnostic tests may be completely automated. In other embodiments, the step of diagnosing the consumer device 15 may include prompting the user to enter input to the diagnostic device 100 and/or perform tasks with the consumer device 15 while it is connected to the diagnostic device 100. In some embodiments, the user may be prompted to enter input identifying the consumer device 15 and/or identifying issues the user has experienced with the consumer device 15. In various embodiments, the user may be prompted to enter input to the diagnostic device 100 indicating identification and/or contact information related to the user and/or the consumer device 15 (e.g., a device make and/or model, a device serial number and/or the like). In various embodiments, the diagnostic device 100 may be further configured to physically inspect the consumer device 15. For example, the diagnostic device 100 may capture and process one or more digital images of the consumer device 15.

After completing the diagnostic test(s) and/or identifying an issue with the consumer device 15 (e.g., a fault condition or the like), or perhaps in response thereto, the diagnostic module 245 may present the results of the diagnostic test(s) to the user and/or provide the results of the diagnostic test(s) to the user dashboard module 240 for use in identifying one or more relevant bids. For example, at 806, the results of the diagnostic test(s) may be used to identify one or more relevant bids, wherein the identified relevant bids may comprise service and/or purchase bids. In various embodiments, the service bids may comprise one or more immediate repair/service and/or ship-in repair bids. A ship-in repair bid may require the user to ship the consumer device 15 to a service provider for the repair to be completed. An immediate repair bid may be a bid to uninstall, reinstall, and/or install one or more software modules on the consumer device 15 via the diagnostic device 100 and/or the like.

An immediate repair bid may indicate a repair related to one or more software modules associated with the consumer device 15. For example, the diagnostic device 100 may determine that the consumer device 15 has an issue that may be resolved by uninstalling, reinstalling, and/or installing one or more software modules that are available to the diagnostic device 100 (e.g., the one or more software modules may be stored on the after-market options server 200 and/or another computing device in communication with the after-market options server 200). For example, if the diagnostic module 245 determines that a software module on the consumer device 15 is corrupted, a relevant bid may indicate an immediate repair including uninstalling the corrupted software module and reinstalling an uncorrupted version of the software module. Thus, if the results of the diagnostic test(s) indicate a fault condition or issue associated with one or more software modules stored on the consumer device 15, one or more immediate repair bids may be identified as relevant bids.

At step 808, information associated with one or more service and/or purchase bids are presented to the user, possibly via the user dashboard module 240. In various embodiments, the user may be presented with information associated with one or more immediate repair bids, one or more ship-in repair bids and/or one or more purchase bids. In various embodiments, an immediate repair bid may be associated with the carrier itself, rather than another service provider. In some embodiments, a service provider that is not the carrier may be associated with an immediate repair bid.

Similar to step 410, at step 810, the user dashboard module 240 may be configured to receive input indicating a selection of a bid by the user. In various embodiments, the input indicating a selection of a bid by the user may be similar to that described above with respect to the user dashboard module 240 and FIGS. 8 and 9. After receiving input indicating user selection of a bid, or perhaps in response thereto, the transaction indicated by the user-selected bid may be facilitated at step 812. In various embodiments, information related to the transaction indicated by the user-selected bid may be stored in the transaction database 255, possibly in association with a transaction ID.

If the user-selected bid is a ship-in repair or purchase bid, the completion of the transaction is similar to that described above herein. If the user-selected bid is an immediate repair bid, the repair may be completed by the diagnostic device 100. FIG. 11 illustrates an example process for facilitating the completion of the transaction if the user-selected bid is an immediate repair bid.

At step 822, the one or more required software modules are requested. In some embodiments, a software module may be stored on the diagnostic device 100, on the after-market options server 200, a service provider system 30, and/or some other computing device in communication with the after-market options server 200 and/or the diagnostic device 100. At step 824, the requested one or more software modules are received. In some embodiments, the diagnostic module 245 may be configured to back up at least some of the data, software modules, and/or other content stored on the consumer device 15 on the diagnostic device 100, after-market options server 200, other computing device or an accessible memory storage area before uninstalling, reinstalling, and/or installing software modules on the consumer device 15. If necessary, the diagnostic module 245 may uninstall and/or otherwise remove a software module, for example, from the consumer device 15 before installing the received one or more software modules onto the consumer device 15, at step 826. After the software module is installed onto the consumer device 15, or possibly in response thereto, the diagnostic module 245 may be configured to re-run the diagnostic test(s) and/or run supplemental diagnostic test(s), at step 828, to determine if the identified fault condition and/or issue has been resolved. At step 830, if the fault condition or issue has not been resolved and/or the diagnostic test(s) identify the same or another fault condition or issue, the process returns to step 804. If the issue has been resolved, compensation for the services rendered may be collected, at step 832. In some embodiments, information related to the transaction may be stored in the transaction database 255.

Bid Database

The bid database 250 may be configured to store one or more service and/or purchase bids submitted by one or more service providers. In various embodiments, the bid database 250 may be configured to track how often a bid is selected by one or more users and/or the total number of times a bid is selected by one or more users. In various embodiments, the bid database 250 may be configured to associate bids for the same or substantially the same target item. For example, in some embodiments, all bids related to MP3 players may be associated or all bids that relate to target items from a specific geological location may be associated. Thus, in various embodiments, the bid database is configured to store one or more bids, information related to one or more bids, bids with similar qualities in association with each other, and/or the like.

Transaction Database

The transaction database 255 may be configured to store information related to one or more open and/or completed transactions. In various embodiments, the transaction database may store a transaction ID in association with information related to the user, information related to the user-selected bid, information related to the service provider indicated by the user-selected bid, a status of the transaction, and/or the like. In various embodiments, when the item is shipped to the service provider and/or from the service provider to the user, a package tracking number may be associated with the shipping package. The package tracking number may be stored in association with the related transaction in the transaction database 255. Thus, in various embodiments, the transaction database is configured to store information related to one or more transactions.

As described herein, service provider dashboard module 235, user dashboard module 240, and diagnostic module 245 are separate modules operating on the after-market options server 200. In various embodiments, the functionality of the modules 235, 240 and/or 245 may be implemented via various methods other than those disclosed herein. For example, in some embodiments, the user dashboard module 240 may be responsible for conducting one or more diagnostic tests on an item, which is described herein with regard to the diagnostic module 245. In another example, modules 235 and 240 may be combined into a single module and/or may operate on a computing system separate from and in communication with the after-market options server 200. Additionally, as described herein, the bid database 250 and the transaction database 255 are distinct databases stored on the after-market options server 200. However, in various embodiments, at least some of the information described herein as being stored in the bid database 250 and/or transaction database 255 may be stored in some other database or via some other method. In some embodiments, the bid database 250 and/or transaction database 255 may be divided into more than one database and/or may be fully or partially incorporated into another database. Thus, modules 235, 240, 245 and databases 250, 255 are described as separate modules and databases herein in order to describe various functions of the various embodiments, rather than to be limiting. Thus, such may be implemented using a variety of techniques and approaches to adapt to various needs and circumstances.

V. Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for providing a consumer with after-market options, the method comprising:

receiving, via one or more processors, a plurality of service bids for a target device, the plurality of service bids being bids to repair the target device, at least one bid of the plurality of service bids being an immediate repair bid, each bid of the plurality of service bids being associated with a bid identifier configured to uniquely identify the bid;

after receiving the plurality of service bids, establishing, via a wired or wireless network, a connection between a consumer device and a diagnostic device;

performing, via the one or more processors and the connection between the consumer device and the diagnostic device, at least one diagnostic test on the consumer device via the diagnostic device, wherein the at least one diagnostic test is configured to identify a fault condition associated with one or more software modules stored on the consumer device;

presenting one or more test results of the at least one diagnostic test to a graphical user interface of the consumer device;

in response to one of the test results indicating the fault condition, identifying, via the one or more processors, one or more service bids of the plurality of service bids for the target device that are relevant to the consumer device, wherein for a bid to be relevant to the consumer device, the target device is substantially the same as the consumer device, and wherein at least one of the one or more service bids includes a time frame for completing the repair of the consumer device;

providing, via the one or more processors, information associated with at least one of the one or more service bids and causing display via the graphical user interface of the at least one of the one or more service bids;

receiving, via the graphical user interface, a user selection of one of the at least one of the one or more service bids displayed via the graphical user interface;

associating the bid identifier associated with the user-selected service bid with a transaction identifier, wherein the transaction identifier is configured to uniquely identify a present transaction corresponding to the consumer device and the user-selected service bid; and in an instance in which the user-selected service bid is an immediate repair bid, responsive to receiving the user selection, un-installing, re-installing, installing, or a combination thereof at least one software module in accordance with the user-selected service bid to repair the fault condition.

2. The method of claim 1 wherein the diagnostic device is a kiosk.

3. The method of claim 1 wherein diagnostic device is a user computing device.

4. The method of claim 1 further comprising:

capturing at least one digital image of the consumer device; and analyzing the digital image to determine a physical condition of the consumer device.

5. The method of claim 1 wherein each of the one or more service bids is for completion of a software service for the target device, a repair of the target device, or disposal of the target device.

6. The method of claim 5 wherein the software service is to be performed via the diagnostic device.

7. The method of claim 5 wherein the repair of the target item comprises shipping the consumer device to a facility associated with a service provider.

8. The method of claim 5 wherein a disposal bid is one of: (a) an offer to purchase the target device, (b) a donation request for donation of the target device, or (c) a recycling option for recycling the target device.

9. A system comprising:
one or more memory storage areas; and
one or more processors in communication with the one or more memory storage areas;
wherein the one or more processors, collectively, are configured to:
establish a connection with a consumer device via a wired or wireless network;
perform at least one diagnostic test on the consumer device via the connection with the consumer device, wherein the at least one diagnostic test is configured to identify a fault condition associated with one or more software modules stored on the consumer device;
present one or more test results of the at least one diagnostic test to a graphical user interface of the consumer device;
in response to one of the test results indicating the fault condition, identify one or more service bids that are relevant to the consumer device, the one or more service bids being bids relevant to repair the consumer device, wherein for a service bid to be relevant to the consumer device the target device is substantially the same as the consumer device, and wherein each service bid is associated with a bid identifier configured to uniquely identify the service bid; and wherein at least one of the one or more service bids includes a time frame for completing the repair of the consumer device;
provide information associated with at least one of the one or more service bids and cause display via the graphical user interface of the at least one of the one or more service bids;
receive, via the graphical user interface, a user selection of one of the displayed service bids;
associate a selected bid identifier with a transaction identifier, wherein the selected bid identifier is the bid identifier associated with the user-selected service bid and the transaction identifier is configured to uniquely identify a present transaction corresponding to the consumer device and the user-selected service bid; and
in an instance in which the user-selected service bid is an immediate repair bid, responsive to receiving the user selection, un-install, re-install, install, or a combination thereof at least one software module in accordance with the user-selected service bid to repair the fault condition.

10. The system of claim 9 further comprising:
at least one connection device; and
wherein the connection with the consumer device is established via the connection device.

11. The system of claim 9 further comprising:
a digital imaging device configured to capture at least one digital image of the consumer device; and
wherein the one or more processors are configured to analyze the at least one digital image to determine a physical condition associated with the consumer device.

12. The system of claim 9 wherein, based at least in part on the results of the diagnostic test, the apparatus is configured to identify one or more fault conditions associated with the consumer device.

13. The system of claim 12 wherein the one or more service bids are each one of: a software service offer for repairing a fault condition related to a software issue associated with the consumer device, repair offer for repairing a fault condition related to a hardware issue associated with the consumer device, a disposal offer for disposing of the consumer device.

14. The system of claim 13 wherein the disposal offer is one of:
(a) an offer to purchase the target device,
(b) a donation request for donation of the target device, and
(c) a recycling option for recycling the target device.

15. The system of claim 13 wherein the offer to repair a fault condition related to a hardware issue comprises shipping the consumer device to a facility associated with a service provider.

16. The system of claim 13 wherein the repairing of the fault condition is to be performed via the diagnostic device.

17. A computer program product for providing a user with after-market service provider options, the computer program product comprising at least one non-transitory computer-readable storage medium having computer-readable program code portions stored therein, the computer-readable program code portions configured to, when executed by at least one processor, cause the processor to at least:
establish a connection with a consumer device via a wired or wireless network;
perform at least one diagnostic test on the consumer device via the connection with the consumer device, wherein the at least one diagnostic test is configured to identify a fault condition associated with one or more software modules stored on the consumer device;
present one or more test results of the at least one diagnostic test to a graphical user interface of the consumer device;
in response to one of the test results indicating the fault condition, identify one or more service bids that are relevant to repair the consumer device, wherein for a service bid to be relevant to the consumer device, the target device is substantially the same as the consumer device, and wherein each service bid is associated with a bid identifier configured to uniquely identify the service bid; and wherein at least one of the one or more service bids includes a time frame for completing the repair of the consumer device;
provide information associated with at least one of the one or more service bids and cause display via theft graphical user interface of at least one of the one or more service bids;
receive, via the graphical user interface, a user selection of one of the displayed bids;
associate a selected bid identifier with a transaction identifier, wherein the selected bid identifier is the bid identifier associated with the user-selected bid and the transaction identifier is configured to uniquely identify a present transaction corresponding to the consumer device and the user-selected bid; and
in an instance in which the user-selected bid is an immediate repair bid, responsive to receiving the user selection, un-install, re-install, install, or a combination thereof at least one software module in accordance with the user-selected bid to repair the fault condition.

18. The computer program product of claim 17 further comprising computer-readable code portions configured to, when executed by at least one processor, cause the processor to at least:

analyze at least one digital image of the consumer device to determine a physical condition associated with the consumer device.

19. The computer program product of claim 17 further comprising computer-readable code portions configured to, when executed by at least one processor, cause the processor to at least:
identify one or more fault conditions associated with the consumer device based at least in part on the results of the diagnostic test.

20. The computer program product of claim 19 wherein the one or more service bids are each one of: a software service offer for repairing a fault condition related to a software issue associated with the consumer device, repair offer for repairing a fault condition related to a hardware issue associated with the consumer device, a disposal offer for disposing of the consumer device.

21. The computer program product of claim 20 wherein the disposal offer is one of:
(a) an offer to purchase the target device,
(b) a donation request for donation of the target device, and
(c) a recycling option for recycling the target device.

22. The computer program product of claim 20 wherein the offer to repair a fault condition related to a hardware issue comprises shipping the consumer device to a facility associated with a service provider.

23. The computer program product of claim 20 wherein the repairing of the fault condition is to be performed via the diagnostic device.

* * * * *

UNITED STATES PATENT AND TRADEMARK OFFICE
CERTIFICATE OF CORRECTION

| | | |
|---|---|---|
| PATENT NO. | : 10,140,654 B2 | Page 1 of 1 |
| APPLICATION NO. | : 14/220454 | |
| DATED | : November 27, 2018 | |
| INVENTOR(S) | : Carrie Parris | |

It is certified that error appears in the above-identified patent and that said Letters Patent is hereby corrected as shown below:

In the Drawings

Sheet 6 of 11, Reference numeral 562: Please remove "Tacking" and replace with --Tracking--.

In the Specification

Column 06, Line 34: Please remove "coproces sing" and replace with --coprocessing--.

Signed and Sealed this
Twenty-ninth Day of January, 2019

Andrei Iancu
*Director of the United States Patent and Trademark Office*